United States Patent
Nassi et al.

(10) Patent No.: US 6,743,984 B2
(45) Date of Patent: Jun. 1, 2004

(54) ELECTRICAL POWER TRANSMISSION SYSTEM USING SUPERCONDUCTORS

(75) Inventors: Marco Nassi, Turin (IT); Pierluigi Ladie', Milan (IT)

(73) Assignee: Pirelli Cavi E Sistemi S.P.A., Milan (IT)

( * ) Notice: Subject to any disclaimer, the term of this patent is extended or adjusted under 35 U.S.C. 154(b) by 232 days.

(21) Appl. No.: 09/886,043

(22) Filed: Jun. 22, 2001

(65) Prior Publication Data

US 2002/0019315 A1 Feb. 14, 2002

Related U.S. Application Data

(63) Continuation of application No. PCT/EP99/10442, filed on Dec. 22, 1999.
(60) Provisional application No. 60/115,632, filed on Jan. 12, 1999.

(30) Foreign Application Priority Data

Dec. 24, 1998 (EP) .............................. 98124699

(51) Int. Cl.[7] .............................. H01B 12/00
(52) U.S. Cl. .................................... 174/125.1
(58) Field of Search .............................. 174/15.1, 15.4, 174/15.6, 21 R, 26 R, 28, 102 R, 103, 106 R, 125.1, 126.1, 126.2

(56) References Cited

U.S. PATENT DOCUMENTS

| 3,728,463 | A | * | 4/1973 | Kullmann et al. | ........ | 174/12 R |
| 4,015,168 | A | * | 3/1977 | Massar | ................ | 361/19 |
| 4,306,266 | A | * | 12/1981 | Born et al. | ................ | 361/80 |
| 4,910,626 | A | * | 3/1990 | Collet et al. | ................ | 361/19 |
| 5,140,290 | A | | 8/1992 | Dersch | ................ | 336/221 |
| 5,475,560 | A | * | 12/1995 | Onishi et al. | ................ | 361/141 |
| 5,546,261 | A | | 8/1996 | Yoshida et al. | ................ | 361/19 |
| 6,005,194 | A | * | 12/1999 | Ries | ................ | 174/125.1 |
| 6,049,036 | A | * | 4/2000 | Metra | ................ | 174/15.5 |
| 6,262,375 | B1 | * | 7/2001 | Engelhardt et al. | ...... | 174/125.1 |
| 6,529,010 | B1 | * | 3/2003 | Saha et al. | ................ | 324/525 |

FOREIGN PATENT DOCUMENTS

| EP | 0 336 337 | | 10/1989 | | |
| EP | 0 646 974 A1 | | 4/1995 | | |
| EP | 0 780 926 A1 | * | 6/1997 | ............ | H01R/4/68 |
| JP | 05258622 | | 10/1993 | | |

* cited by examiner

*Primary Examiner*—William H. Mayo, III
(74) *Attorney, Agent, or Firm*—Finnegan, Henderson, Farabow, Garrett & Dunner, L.L.P.

(57) ABSTRACT

The present invention relates to an electrical power transmission system using superconductors which is compatible with conventional transmission systems. In a first aspect, a method for installing in an electrical power transmission system a connection using a coaxial superconducting cable, includes determining a reactance of a conventional cable suitable for the connection; installing the coaxial superconducting cable, and increasing a reactance of the coaxial superconducting cable, in such a way that the reactance of the superconducting cable is substantially equal to the reactance of the conventional cable. In particular, increasing the reactance of the coaxial superconducting cable includes connecting in series with the coaxial superconducting cable an inductive element, preferably made from a superconducting material.

10 Claims, 3 Drawing Sheets

ELECTRICAL POWER TRANSMISSION SYSTEM USING SUPERCONDUCTORS

This application is a continuation of international application number PCT/EP99/10442, filed Dec. 22, 1999, which is incorporated by reference herein and claims the priority of European Patent Application No. 98124699.4, filed Dec. 24, 1998, which is incorporated herein by reference, and the benefit of U.S. Provisional Application No. 60/115,632, filed Jan. 12, 1999, which is incorporated by reference.

FIELD OF THE INVENTION

In general terms, the present invention is related to an electrical power transmission system using superconductors which is compatible with conventional transmission systems.

BACKGROUND OF THE INVENTION

As is known, superconductors are metals, alloys, oxides, and, in general, compounds which, below a temperature normally referred to as the critical temperature, show a fall in resistivity to practically zero values.

In particular, a superconductor will remain superconducting only below its critical temperature, below a critical magnetic field, and below a critical current density.

Superconducting materials may be of the low-temperature type, which are generally metals such as alloys of niobium and titanium, or of the high-temperature type, which are generally ceramics such as those based on bismuth, strontium, calcium and copper oxides (BSCCO) or yttrium, barium and copper oxides (YBCO).

Reference may be made, by way of example, for one of these materials and for its preparation, to the description in European Patent EP 646 974 held by the present Applicant.

In the field of superconductors and for the purposes of the present description, the term "low-temperature superconducting materials" denotes materials having an operating temperature of the order of 4°K (approximately −269° C.), and "high-temperature superconducting materials" denote materials having an operating temperature of the order of 70–77°K (approximately −203/−196° C.).

In order to operate at these temperatures, these superconductors are cooled with suitable coolant fluids, such as liquid helium for the low temperatures and liquid nitrogen for the high temperatures.

For the purposes of the present description, "conventional cable" denotes a non-superconducting cable using electrical conductors with non-zero resistance, in particular a cable which has at least a significant portion with characteristics of non-zero electrical resistance. An electrical power transmission or distribution network generally comprises a set of connecting lines consisting of cables or overhead lines, connected in different ways (in terminal load, loop, or mesh configuration) and capable of carrying energy between units connected to interconnection nodes (of the connecting lines of the network) or to terminal nodes of the network, such as sub-stations supplied by electrical power plants, transformer stations and user loads.

Transmission networks may occasionally be subjected to overcurrents, in other words currents having a value higher than the operating value, which occur in the presence of faults and particularly in the presence of short circuits of the equipment and particularly of the lines. In the cables, these overcurrents may cause not only electrodynamic forces capable of damaging parts not securely fixed to the structures, but also an excessive temperature rise which, if persistent, may result in the burning of insulators and fires in combustible materials close to the insulators (transformer oil, for example).

In installations with conventional networks, overcurrent protection is provided by the use of automatic circuit breakers which, by means of an automatic cut-out and reconnection device, open the circuit at a current value equal to a set value and reclose the circuit when the overcurrent ceases.

For the protection of these circuit breakers or other equipment present in an installation, such as transformers, it is possible to use, among other systems, current limiting devices which may be of the induction or resistance type.

The current limiter, installed in series with the equipment to be protected, has a low impedance during normal operation, but when an overcurrent occurs in the network it increases its impedance in such a way as to limit the current to below a threshold value so as not to damage the circuit breaker or transformer. There are known overcurrent limiters, comprising inductances, which make use of the superconductivity characteristics of the materials. Under normal conditions, these limiters, or parts of them, are in a superconducting state and are designed in such a way that they have a low impedance. In the presence of overcurrents, they leave the superconducting state and behave in such a way as to have a high impedance.

Limiters of this type are described, for example, in the patents U.S. Pat. No. 5 140 290, U.S. Pat. No. 5 546 261 and EP 336 337.

The book "Impianti elettrici", by Filippo Tiberio, Published by Vanini, Brescia, 1953, describes, for conventional non-superconducting networks, the use of reactance coils which are connected either to the busbars (in series between two sections of bar) or to the lines (in other words between the bars and the lines departing from the power plant).

SUMMARY OF THE INVENTION

The Applicant has observed that superconducting cable installations are typically intended to be provided within a conventional network, for example by replacing a conventional cable with a superconducting cable between two nodes of the network, or by inserting a new section.

The Applicant has observed that the problem of the compatibility between transmission systems using superconductors and transmission systems using conventional conductors has not been tackled in the prior art.

In particular, the Applicant has tackled the problem of the behavior of transmission systems using coaxial superconducting cables inside a conventional network in case of a short circuit.

The Applicant has noted that the introduction of a coaxial superconducting cable into a network might lead to an increase in the value of the short-circuit current in the branch in question as a result of the lower value of the characteristic impedance of the coaxial superconducting cable by comparison with that of a conventional cable.

It has also noted that the line comprising the coaxial superconducting cable, having a lower characteristic impedance than that of conventional lines, forms a preferential path for the short-circuit currents, involving the lines close to it which might have to withstand a higher current than a conventional line.

The low characteristic impedance of coaxial superconducting cables is due to their low resistance and also to their low reactance. The latter value is the one which has most effect on the absolute value of the impedance. The reactance of a coaxial superconducting cable is low owing to its coaxial structure, which comprises a phase superconductor and a return superconductor which carries in the opposite direction to the phase conductor a quantity of current equivalent to that carried by the latter. In conventional non-coaxial cables, however, the reactance is a function of the geometrical characteristics of the cable and also of the relative positioning of one cable with respect to the others.

At this point, the Applicant tackled the problem of ensuring the compatibility of a coaxial superconducting cable, in the presence of overcurrents, with the whole network.

The Applicant has also observed that short circuits create problems for superconducting cables. In particular, it has observed that in the presence of a short circuit the superconductor passes from the superconducting state to the state of normal conduction, in other words the resistive state; in this state, the emission of heat by the Joule effect increases considerably, and consequently there is an increase in the temperature of the cable with potential evaporation of the coolant liquid. When normal operating conditions are restored, in other words at the end of the short circuit, the superconductor must return to the nominal operating temperature, in other words it must cool down, to return to the superconducting state. This means that the superconducting cable cannot operate correctly immediately on the restoration of the short circuit, since it is necessary to wait for it to cool and return to the superconducting state.

Given the aforementioned problems in a network using conventional cables and coaxial superconducting cables, the Applicant has realized that the problems can be resolved, or in any case diminished, by making the electrical behavior of the coaxial superconducting lines in the presence of overcurrents substantially equivalent to the behavior of analogous lines using conventional cables.

In greater detail, the Applicant has realized that the electrical value of the superconducting line which is most important for the problems stated previously is the inductive reactance of the cables which constitute it, this value being significantly lower in coaxial superconducting cables than in conventional cables.

Even more particularly, the Applicant has found that a solution to the reported problems is obtained by raising the value of the inductive reactance of the coaxial superconducting cable to a value equal or close to that of a conventional cable in the same operating conditions.

An embodiment of the present invention comprises the connection in series with the coaxial superconducting cable of an inductive element having a value of reactance such that the total value of reactance (for the cable and the inductor) is made equal or close to that of a conventional cable for the same connection.

The Applicant has found that this solution makes it possible to obtain complete compatibility of the superconducting line with a conventional network.

According to another aspect of the present invention, the Applicant has also found that, in order to prevent the superconducting cable from overheating when, in, the presence of overcurrents, the superconductor passes from the superconducting state to the state of normal conduction, the cable has to be provided with an additional current path in parallel with the superconducting cable.

The Applicant has further noted that when the teachings of the invention are applied it becomes unnecessary to provide the network comprising superconducting lines with protective devices which are different (in other words capable of withstanding and stopping higher currents) from those used for the similar network comprising conventional lines.

In a first aspect, the present invention relates to an electrical power transmission network comprising: interconnecting nodes of the network and connecting lines between said nodes; a coaxial superconducting cable with which is associated a first reactance, connected between two nodes of said network; characterized in that it also comprises at least one inductive element, with which is associated a second reactance, connected in series with said coaxial superconducting cable.

Preferably, the sum of said first reactance and said second reactance is substantially equal to a third reactance whose value is substantially equal to the reactance of a conventional cable suitable for such a connection.

In particular, said at least one inductor comprises a superconducting cable, and may also comprise a core.

said at least one inductor is located at one end of said coaxial superconducting cable, or alternatively comprises two parts, of which one is located at one end of said superconducting cable and the other is located at the opposite end.

In one embodiment, said coaxial superconducting cable is of the multiple-phase type, and comprises at least one inductor connected in series with each phase of said coaxial superconducting cable.

In an advantageous embodiment, said coaxial superconducting cable comprises a support of conducting material and, in an alternative embodiment, a support of composite material.

In a second aspect, the present invention relates to a method for installing in an electrical power transmission system a connection using a coaxial superconducting cable, characterized in that it comprises the following steps:
  determining the reactance of a conventional cable suitable for said connection;
  installing said coaxial superconducting cable having a predetermined reactance;
  increasing the reactance of said coaxial superconducting cable, in such a way that said reactance of said superconducting cable is substantially equal to the reactance of said conventional cable.

In particular, the step of increasing the reactance of said coaxial superconducting cable comprises the step of connecting in series with said coaxial superconducting cable an inductive element, preferably made from a superconducting material.

Advantageously, according to another aspect of the present invention, the method also comprises the step of associating with said coaxial superconducting cable a parallel conducting path of predetermined resistance, so that the short-circuit current is distributed between said superconducting cable and said conducting path in such a way that the maximum temperature reached by said coaxial superconducting cable is lower than the minimum temperature between the critical temperature of the superconducting material and the boiling point of the coolant fluid at the minimum working pressure of the fluid.

In a third aspect, the present invention relates to a method for replacing, in an electrical power transmission system, a conventional cable connection with a coaxial superconducting cable connection, comprising the following steps:
  removing said conventional cable;
  installing said coaxial superconducting cable; characterized in that it additionally comprises the step of increasing the reactance of said coaxial superconducting cable.

Preferably, the method additionally comprises the step of:

determining the reactance of said conventional cable;

increasing the reactance of said coaxial superconducting cable in such a way that the reactance of said coaxial superconducting cable is substantially equal to the reactance of said conventional cable.

In particular, the step of increasing the reactance of said coaxial superconducting cable comprises the step of connecting in series with said coaxial superconducting cable an inductance, preferably made from superconducting material.

Advantageously, the method also comprises the step of associating with said coaxial superconducting cable a parallel conducting path in such a way that the maximum temperature reached by said coaxial superconducting cable is lower than the minimum temperature between the critical temperature of the superconducting material and the boiling point of the coolant fluid at the minimum working pressure of the fluid.

In a fourth aspect, the present invention relates to a thermally insulated terminal for connection between a multiple-phase cable and an electrical installation at ambient temperature, said cable comprising, for each phase, at least one coaxial unit having a phase superconductor, a coaxial return superconductor and an interposed layer of electrical insulation, and also thermal control means for maintaining said superconductors of each of said coaxial units in the superconducting state, said terminal being characterized in that it comprises an inductor connected in series with each phase superconductor.

Preferably, the terminal comprises:

at least one casing, cooling means, a live current lead for each phase superconductor, having a corresponding phase connector for connection to said installation at ambient temperature, said current lead being provided with a resistive conductor between the phase superconductor and said connector of the current lead, the areas of connection between said resistive conductors and said phase superconductors being located inside the casing.

Preferably, the terminal comprises:

a single return current lead provided with a single resistive return conductor, with an upper end connected to a return connector for connection to the installation at ambient temperature;

connecting means made from a superconducting material between said return superconductors and said single resistive return conductor, the area of the junction between said connecting means made from a superconducting material and said single resistive return conductor, and at least said connecting means between the return superconductors and said single resistive conductor, being inside the casing and being at a temperature below the critical temperature corresponding to the superconducting state owing to the presence of said cooling means.

BRIEF DESCRIPTION OF THE DRAWINGS

The present invention will be more clearly understood with the aid of the following description and the attached figures of examples of embodiments of the present invention, in which.

DESCRIPTION OF THE EMBODIMENTS

Figure 1:
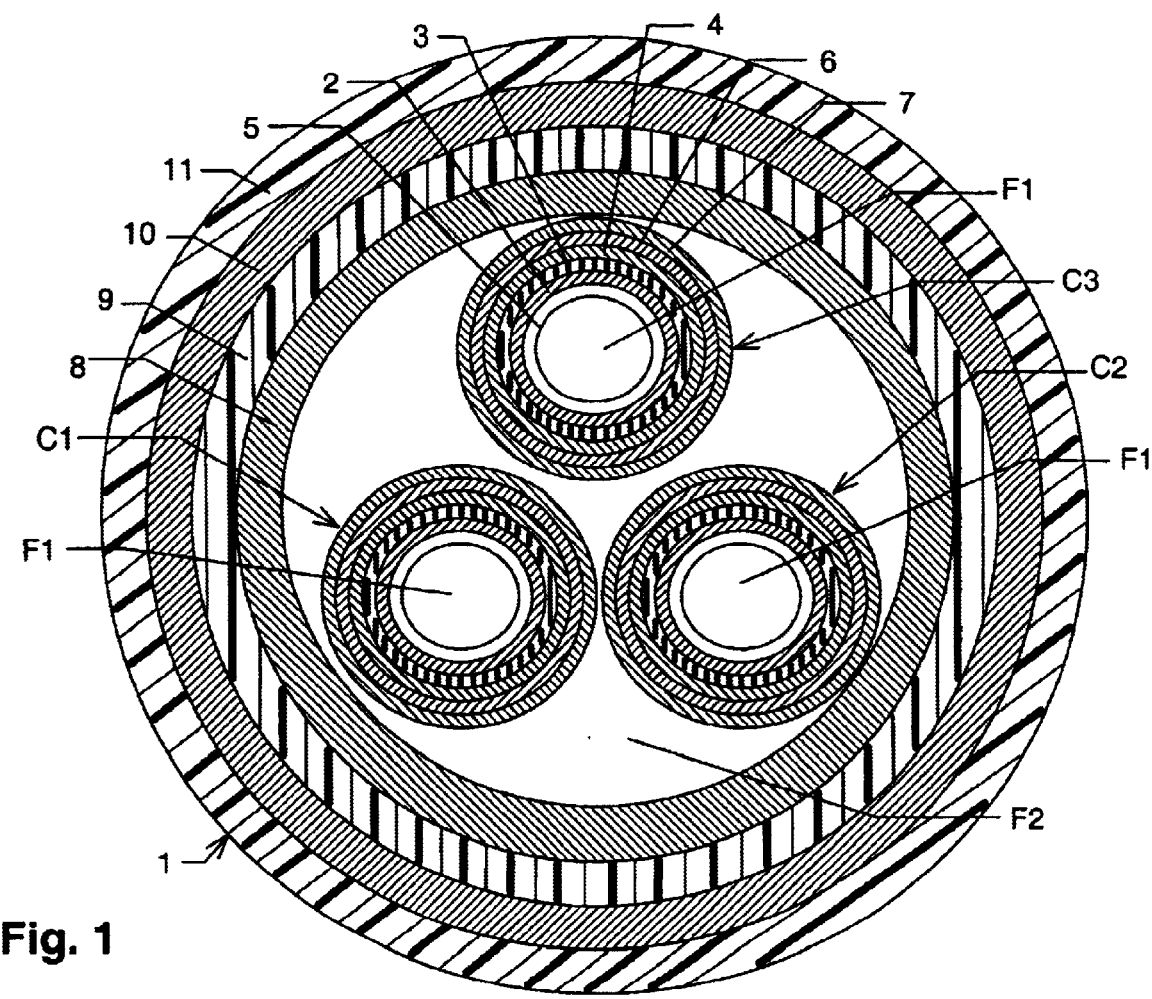
FIG. 1 shows a superconducting three-phase cable.

With reference to FIG. 1, an example of a three-phase superconducting cable 1 according to the present invention comprises three conducting elements C indicated by $C_1$, $C_2$, $C_3$ respectively, one for each of the phases, preferably housed loosely inside a tubular containing casing 8, made for example from a metallic material such as steel, aluminum or the like.

Each of the conducting elements C in turn comprises a pair of coaxial conductors, namely the phase conductor 2 and the return conductor 4, each of these including at least one layer of superconducting material.

The coaxial phase conductor 2 and return conductor 4 are electrically insulated from each other by the interposition of a layer 3 of dielectric material. In the example illustrated, the superconducting material is incorporated in a plurality of superimposed strips wound on a tubular supporting element 5 and on the electrical insulation 3 respectively.

The cable 1 also comprises appropriate means for cooling the superconducting conductors 2 and 4 to a temperature sufficiently lower than the critical temperature of the previously selected superconducting material, which in the cable in FIG. 1 is of the type called "high-temperature".

The aforesaid means comprise suitable pumping means, which are known per se and therefore are not shown, designed to supply an appropriate coolant fluid, for example liquid nitrogen, at a temperature typically ranging from 65° to 90°K, both into the interior F1 of each of the conducting elements C and into the interstices F2 between these elements and the tubular casing 8.

Outside the return conductor 4 there is a metal protective element 6 for short circuits and then a mechanical protective element 7.

In order to reduce to a minimum the dissipation of heat towards the external environment, the superconductor is enclosed within a containing structure, or cryostat, comprising a thermal insulator, formed, for example, by a plurality of superimposed layers of insulating material, and at least one protective sheath.

A cryostat, which is known in the art, is described for example in an article in IEEE Transactions on Power Delivery, vol. 7, no. 4, October 1992, pp. 1745–1753.

More particularly, in the example illustrated, the cryostat comprises a layer 9 of insulating material, consisting, for example, of a plurality (a few tens) of strips of metal-coated plastic material (polyester resin for example), known in the art as "thermal superinsulation", wound loosely, with the aid of interposed spacer elements (not shown) if necessary.

These strips are housed in an annular gap delimited by the casing 8 and a tubular element 10, in which a vacuum of the order of $10^{-2} N/M^2$ is maintained by equipment which is known per se.

The tubular element 10, made from metal, is capable of imparting the desired waterproofing to the annular gap, and is covered with an outer sheath 11, made for example from polyethylene.

The metal tubular element 10 is preferably formed from a strip curved into a tubular shape and welded longitudinally, made from steel, copper, aluminum or the like, or from an extruded tube or similar element.

The element 10 may be corrugated if this is necessary to meet the requirements for flexibility of the cable.

In one embodiment, the superconducting material of the cable is formed by strips based on superconductors, known as high-temperature superconductors, of the ceramic type.

More particularly, in this embodiment the superconductor strips are wound around the tubular cylindrical support 5, having a diameter of 15–80 mm, and around the electrical insulation 3, with winding angles with respect to the direction of the cable which are constant or variable between strips and within each strip, and typically ranging from 10° to 60°.

The high-temperature superconductor strips comprise, inside a casing made from silver or similar metal alloy, superconducting materials, of which it is expedient to use those known in the field by the symbol BSCCO, having the formula:

$$Bi_\alpha Pb_\beta Sr_\gamma Ca_\delta Cu_\epsilon O_x.$$

where
α is a number from 1.4 to 2.0; β is a number from 0 to 0.6; γ is a number from 1.5 to 2.5; δ is a number from 0 to 2.5; ε is a number from 1.0 to 4.0; and x is the stoichiometric value corresponding to the various oxides present.

According to the present invention, if it is desired to have a rapid, or even instantaneous, restoration time of the superconducting cable after a short circuit, or in other words a restoration time which is such that the temperature rise of the superconducting cable is limited, the tubular cylindrical support 5 and the protective layer 6 preferably consist of a conducting material, for example copper or aluminum of suitable dimensions. The elements 5 and 6 are associated with the strips of the superconducting cable in such a way that there is an electrical connection between them. In this way, in case of overcurrent, the superconductor passes into the resistive state, and the overcurrent flows in the conduction path parallel to the superconducting cable formed by the metals of the elements 5 and 6. The quantity of conductive metal material in the elements 5 and 6 is such that the maximum temperature reached by the superconducting cable is lower, with a predetermined safety margin, than the minimum temperature between the critical temperature of the superconducting material and the boiling point of the coolant fluid (nitrogen) at the minimum working pressure of the fluid.

Preferably, the superconducting strips comprise at least one reinforcing strip (not illustrated) of metallic material (stainless steel, bronze, beryllium, or aluminum) joined to the metal coating of the strips. The presence of this reinforcing strip makes it possible to increase the resistance of the cable to the various mechanical or thermal stresses imparted to it during installation or use.

According to a further embodiment of the present invention, the support 5 is of composite type and comprises a plurality of adjacent annular sectors of metallic material and plastic material (for example Teflon). This element 5 thus has a coefficient of thermal expansion greater than that of the superconducting material and is therefore able to contract to a greater degree than the superconducting material during the step of cooling of the cable, without inducing stresses inside the superconducting material by interfering with it.

The number of metal and plastic sectors and the positioning of these sectors can be determined by a person skilled in the art according to the design requirements of the cable.

Advantageously, the support 5 thus carries out a plurality of functions simultaneously. One of these is to limit the longitudinal deformations of the layer of superconducting material due to the impeded thermal expansions during the cooling of the superconducting cable after it has been installed (at ambient temperature). One is to mechanically support the superconducting material, and another is to reduce the stresses exerted by the ends of the superconducting cable on the terminals of the cable, while at the same time providing sufficient metal to stabilize the cable during the transient short circuit.

A type of three-phase coaxial superconducting cable has been described by way of example, but other types of cable may be used in accordance with the present invention, for example mono-phase cables, or mono-element cables (in other words separate cables for each phase); the cryostat may also be constructed differently, for example with the electrical insulation kept at ambient temperature.

The superconducting cables are generally connected to the substations or to the transformer stations of the distribution or transmission network by means of connection terminals such as, for example, those described in European Patent Application EP 780926 in the name of the present Applicant.

Figure 2:
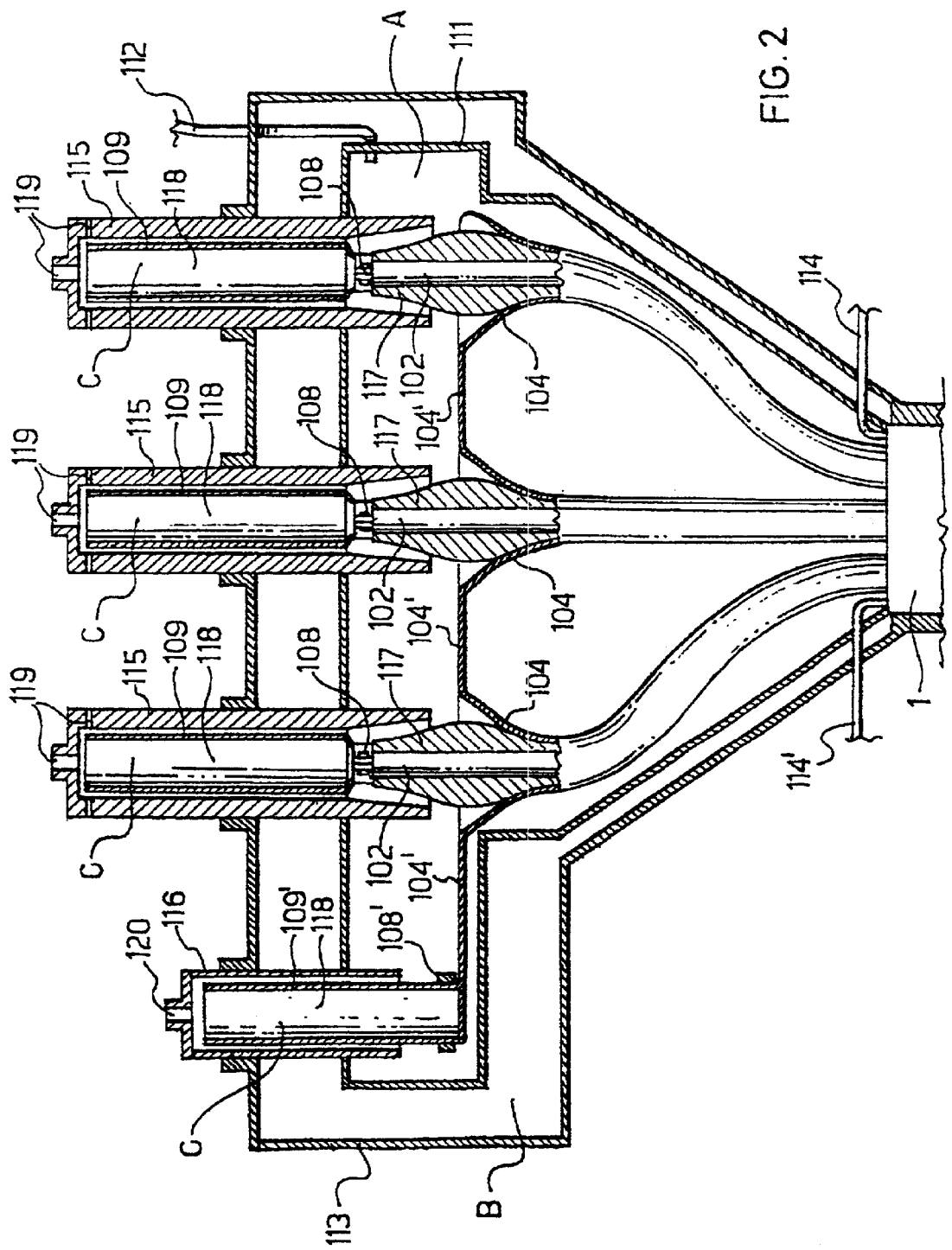
FIG. 2 shows a connecting terminal for three coaxial superconducting cables.

A terminal for connection between three mono-phase coaxial superconducting cables cooled to below their critical temperature and the corresponding terminals at ambient temperature, described in the above patent application, is shown in FIG. 2.

The system for cooling the cables and terminal is not described here, since it is well known to those skilled in the art.

Principally, the terminal comprises a cold area A within which the parts of the cable are kept below its critical superconductivity temperature, a thermal insulation area B located around the area A, and a heat control area C, in which means are provided to counteract the penetration of heat from the exterior at ambient temperature towards the cold area of the cable.

The lower portion of FIG. 2 shows the entry into the terminal of three coaxial cables, each of the mono-phase type, belonging to the single cable 1.

More precisely, each live phase superconductor 102 extends into the cold area and is connected by a terminal clamp 108 to a resistive conductor 109; in turn, the conductor 109 passes through the heat control area C and is finally connected to a connector 119 of the electrical installation at ambient temperature.

From their entry into the cold area, the three return superconductors 104 are interconnected by superconducting connecting means 104', and are connected by means of a clamp 108' to a single current lead formed by a resistive conductor 109' which extends towards the exterior like the other phase conductors through the connector 120.

The superconducting connecting means comprise a superconducting element formed in accordance with the particular arrangement of the final part of the return conductors.

As will be seen in FIG. 2, the cold area of the terminal is delimited by a casing 111 of metallic material, into which a coolant fluid, preferably liquid nitrogen at a temperature of approximately −200° C., is injected through an inlet tube 112.

The injection of liquid nitrogen into the casing at a given temperature and the degree of thermal insulation around the casing are controlled in such a way that the cold area of the casing is always at a temperature below the critical temperature, in other words the temperature above which the superconductors would cease to behave as superconductors.

The thermal insulation area around the casing is provided by a container 113 which delimits a space, in which a vacuum is maintained, around the casing.

The three single-core cables, each of which is kept below the critical temperature by means of liquid nitrogen circulating inside it as shown in the figure by the inlet and outlet-tubes 114 and 114', are brought to the entry of the container and of the casing.

The phase conductor 109 and the return conductor 109' pass through the cover of the casing and of the container remaining inside high- and low-voltage insulators 115 and 116 respectively.

The lower portion of the internal surface of each insulator is shaped in the form of a truncated cone opposing, and spaced apart from, a deflector cone 117 around the phase superconductor, for the purpose of controlling the electrical field.

Figure 3:
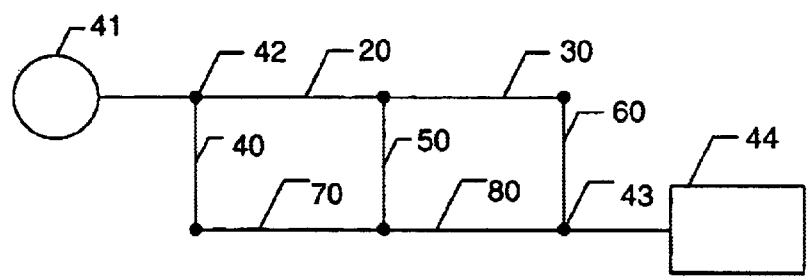
FIG. 3 shows schematically a distribution line according to an example of an embodiment of the invention.

An electrical power transmission/distribution system, shown schematically for illustrative purposes in FIG. 3, will now be considered.

This network comprises a plurality of cables 20, 30, 40, 50, 60, 70 and 80, which extend between a node 42, connected to a generator 41, and a node 43 which is connected to a load of any kind 44.

The cables 20, 30, 40, 50, 60, 70 and 80 are considered to consist of conventional, non-superconducting cables, with which a characteristic impedance can be associated.

It will now be assumed that the conventional cable 60 is replaced with a coaxial superconducting cable of equal length.

This cable, by its very nature, has a characteristic impedance which is much smaller than the impedance of the replaced conventional cable.

In the event of a short circuit, for example in the case in which the node 43 is brought to earth potential, there will be a flow of (short-circuit) current between the node 42 and the node 43, passing through the conductors of the network. Owing to the difference in impedance between the cable 60 (with practically zero impedance) and the remaining cables, most of the current will flow in the cable 60.

This also causes an excess current load in the cables connected to the cable 60; in particular, there will be a considerable inflow of current into the cables 20 and 30, greater than that which would occur if the cables were all of the conventional type, thus possibly causing damage to the network.

A similar situation would also occur if a new coaxial superconducting cable were added to the network, for example by adding a section between the generator 41 and the node 42.

More particularly, it has been calculated that if a complex mesh network (such as that required for supplying a major urban centre, for example) were constructed with superconducting cables, there would be an increase in short-circuit current of up to 70% with respect to if this network were constructed with conventional cables.

According to the present invention, the Applicant has found that these problems are resolved by making the electrical behavior of the coaxial superconducting lines in the presence of overcurrents substantially identical to that of similar lines using conventional cables.

In particular, it has found that, by connecting the coaxial superconducting cable in series with an inductive element having a value of reactance such that the total value of reactance (for the cable and inductor) is equal or close to (of the same order of magnitude as) that of a conventional cable for the same connection, the behavior of the network in the presence of overcurrents is brought back to that found when the network consists of cables entirely of the conventional type.

Figure 4:
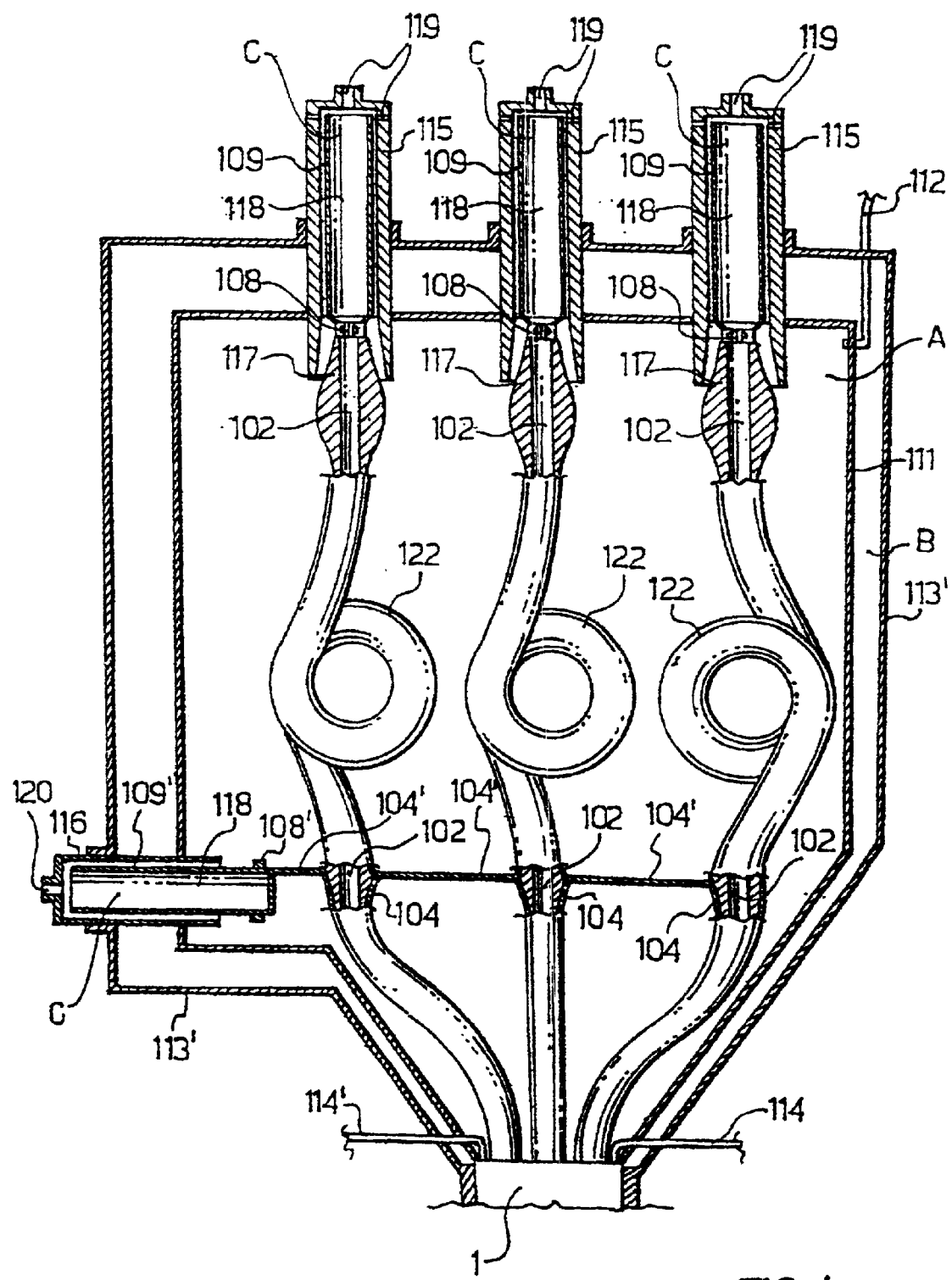
FIG. 4 shows the terminal in FIG. 2 according to an example of an embodiment of the invention.

FIG. 4 shows a particular embodiment of a connecting terminal according to the invention, comprising a connecting terminal similar to that described previously with reference to FIG. 2. In FIG. 4, the same numerical references as in FIG. 2 are used to indicate components of the same type.

The lower portion of FIG. 4 shows the entry into the terminal of the three coaxial cables belonging to the cable 1. The three return superconductors 104, from the entry into the cold area A, are interconnected by superconducting connecting means 104', and are connected, through a clamp 108', to a single current lead formed by the resistive conductor 109' which is extended towards the exterior by the connector 120.

The three phase superconductors 102, of suitable dimensions, which extend inside the casing 113', are wound in such a way as to form three reactance coils 122 with a value determined as described previously.

The three coils 122 should preferably be positioned in such a way as to prevent mutual induction.

In a similar way to that described with reference to the terminal in FIG. 2, each live phase superconductor 102 extends into the cold area A and is connected by a clamp 108 to a resistive conductor 109; in turn, the conductor 109 passes through the heat control area C and is finally connected to a connector 119 of the electrical installation at ambient temperature.

The reactance coils 122 are preferably located inside the terminal, but may be located at any point along the superconducting cable. Additionally, because of problems of size or various other factors, the reactance coils 122 may, for example, be distributed between the two terminals (for example by dividing the reactance into two parts), and may in any case be divided into a plurality of parts and located at a plurality of points along the superconducting cable.

A numerical example of a method of designing a connecting line according to the invention is shown below.

Figure 5:
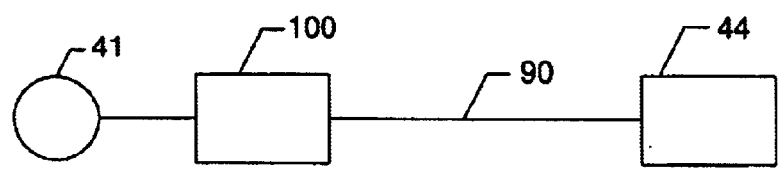
FIG. 5 shows schematically a radial transmission line.

FIG. 5 shows schematically a generator 41 connected to a network 100. A connecting line 90 connects the network 100 to a load 44.

The connection made by the line 90 has the following characteristic parameters:

Power $P$=108 MVA

Voltage $V$=115 kV

Frequency $f$=60 Hz

Length $L$=8 km

Using these parameters it is possible to determine, by a method known to those skilled in the art, in a first approximation, the characteristics of the cable suitable for this connection.

The term "conventional cable suitable for this connection" denotes a cable capable of transmitting electrical power in a connection having predetermined characteristic parameters. For example, the principal characteristic parameters of a connection, such as those listed above, namely power, voltage, frequency and length, may be used, in a first approximation, to determine using known methods the cable section of the three-phase group of three cables suitable for this connection. Consequently it is possible to determine the reactance of the individual cable using known methods.

A possible embodiment of the connection specified above with conventional cables comprises the use of a group of three copper cables with a section of 500 $mm^2$.

In this case, the inductive reactance of the individual conventional cable, which depends on the type of conductor and on the closeness to the other conductors, is: Xconv=0.16 ohm/km If it is now assumed that a short-circuit current of 5000 A reaches the connection 90 from the external network 100, it is found, by methods of calculation known to persons skilled in the art, that there will be an overcurrent of approximately 4190 A at the end of the connection 90, in other words at the end near the load 44.

The connecting line 90 specified above, if formed by using a group of three coaxial superconducting cables, has an inductive reactance of the individual superconducting cable equal to:

$$Xsup=0.0264 \text{ ohm/km}$$

The Applicant has observed that the value of reactance of the coaxial superconducting cable is considerably lower than that of the conventional cable and equal, in the example shown, to approximately one sixth.

If it is now assumed that a short-circuit current, again having a value of 5000 A, reaches the connection from the network 100 outside the connection 90, formed in this case with coaxial superconducting cables, there will be an overcurrent of approximately 4500 A at the end of the connection, with an increase of approximately 7% by comparison with the previous case.

According to the present invention, after the three return superconductors of the cables have been connected together and to the earth in a similar way to that described with reference to FIG. 4, a solenoid is formed on the conductor of each phase, and has the following reactance:

$$Xadd=Xconv-Xsup=(0.16-0264) \text{ ohm/km}=0.1336 \text{ ohm/km}$$

and therefore the following inductance $$Ladd=Xadd/(2\pi f)=0.354 \text{ mH/km}.$$

where

Xadd is the reactance to be connected in series with the individual phase for each km of the connection;

Xconv is the reactance of the conventional cable for each km of the connection;

Xsup is the reactance of the coaxial superconducting cable for each km of the connection;

Ladd is the inductance to be connected in series with the individual phase for each km of the connection.

In this way an effect similar to that of a conventional cable, in other words that of canceling the increase in the aforementioned short-circuit value, is obtained. The connection 90, therefore, behaves in the presence of a short circuit as if it had been constructed with conventional cables.

An inductive element having Ladd=0.354 mH/km×8 km=2.83 mH is obtained, for example, by constructing a solenoid with the outgoing conductor of each phase of the superconducting cable. The characteristics of this solenoid are:

number of turns=26 turn radius=1.5 m height of winding=2 m length of conductor=245 m

The additional inductive element, according to a further embodiment of the invention, may comprise a solenoid having a suitable magnetic core whose characteristics become, for example:

number of turns=1 turn radius=0.5 m height of winding=<0.2 m length of conductor=3.14 m

In this example, it is assumed that the coaxial superconducting cable is connected in series with a reactance whose value is equal to the difference between the reactance of a conventional cable and the reactance of the superconducting cable, in such a way that the value of reactance for the conventional cable, which is suitable for this connection, is substantially the same as that of the superconducting cable. However, it is possible to connect a reactance whose value is equal to a fraction of the aforesaid reactance (equal to half, for example) by accepting, if the components of the system permit, the relative increase in the short-circuit current. For example, if a reactance whose value is equal to half that of the conventional cable:

Xadd1=(Xconv−Xsup)/2=(0.16−0.0264)/2 ohm/km=0.0668 ohm/km is connected in the connection described previously, the increase in the short-circuit current is approximately 4%.

It is also possible to connect the coaxial superconducting cable in series with a reactance whose value is such that the total reactance exceeds that of a conventional cable in such a way as to provide better behavior than that of a conventional cable. In any case, in order to make a connection using coaxial superconducting cables substantially compatible with an equivalent conventional cable suitable for this connection, the reactance of the superconducting cable must be increased, and must preferably be of the same order of magnitude as that of the conventional cable.

The Applicant notes that the additional inductive element may be located preferably at any of the ends of the phase superconductor and preferably in that area of the terminal where the superconducting cable is connected to the conventional cables at ambient temperature.

According to a further embodiment, it is possible to use two additional inductive elements located at both ends of the phase superconductor and having a total value of inductance equal to that determined as described above.

The aforesaid inductive element may also be made from a conventional conductor (made of copper, for example) placed in air at ambient temperature.

The Applicant observes, however, that the invention is particularly advantageous if this inductive element is made with the same superconducting cable without the return conductor. This is because this method considerably reduces the resistive losses generated throughout the length of the conductor used to form the solenoid. In the case in question, the losses of a solenoid formed from a copper conductor having a section of 500 mm$^2$, for example, are of the order of 12 W/m/phase, while the losses of the solenoid formed from a superconductor are of the order of 6 W/m/phase (including the cooling efficiency).

Additionally, both the superconducting cable and the additional inductive element may advantageously have the metal or composite type of support as described previously.

What is claimed is:

1. Electrical power transmission network, comprising:
   interconnecting nodes; connecting lines connected between said nodes;
   a coaxial superconducting cable with which is associated a first reactance, said coaxial superconducting cable being connected between two of said nodes; and at least one inductive element, with which is associated a second reactance, said at least one inductive element being connected in series with said coaxial superconducting cable.

2. Network according to claim 1, wherein the sum of said first reactance and said second reactance is substantially equal to a third reactance whose value is substantially equal to the reactance of a conventional cable suitable for such a connection.

3. Network according to claim 1, wherein said at least one inductive element comprises a superconducting cable.

4. Network according to claim 1, wherein said at least one inductive element comprises a core.

5. Network according to claim 1, wherein said at least one inductive element is located at one end of said coaxial superconducting cable.

6. Network according to claim 1, wherein said at least one inductive element comprises two parts, of which one is located at one end of said superconducting cable and the other is located at the opposite end thereof.

7. Network according to claim 1, wherein said coaxial superconducting cable has multiple phases.

8. Network according to claim 7, wherein the network comprises at least one inductive element connected in series with each phase of said coaxial superconducting cable.

9. Network according to claim 1, wherein said coaxial superconducting cable comprises a support of conducting material.

10. Network according to claim 1, wherein said coaxial superconducting cable comprises a support of composite material.

* * * * *